United States Patent
Oishi et al.

(10) Patent No.: US 7,110,750 B2
(45) Date of Patent: Sep. 19, 2006

(54) METHOD AND APPARATUS FOR CHOOSING A BEST PROGRAM FOR COMMUNICATION

(75) Inventors: Takumi Oishi, San Mateo, CA (US); Kazuho Miki, San Francisco, CA (US)

(73) Assignee: Hitachi, Ltd., Tokyo (JP)

( * ) Notice: Subject to any disclaimer, the term of this patent is extended or adjusted under 35 U.S.C. 154(b) by 88 days.

(21) Appl. No.: 10/836,955

(22) Filed: Apr. 30, 2004

(65) Prior Publication Data

US 2005/0245274 A1    Nov. 3, 2005

(51) Int. Cl.
*H04M 3/42* (2006.01)

(52) U.S. Cl. .............................. 455/414.1; 455/456.1; 370/259; 715/758; 709/203; 709/204

(58) Field of Classification Search ............. 455/414.1, 455/414.2, 425, 433, 456.1, 456.3, 456.5, 455/459, 566; 707/1; 709/203, 204, 206, 709/250; 715/758; 370/259–261, 313
See application file for complete search history.

(56) References Cited

U.S. PATENT DOCUMENTS

| | | | |
|---|---|---|---|
| 6,807,423 B1 * | 10/2004 | Armstrong et al. | 455/440 |
| 6,853,634 B1 * | 2/2005 | Davies et al. | 370/349 |
| 2002/0087645 A1 | 7/2002 | Ertugrul et al. | |
| 2002/0156843 A1 * | 10/2002 | Hashimoto et al. | 709/203 |
| 2003/0009530 A1 * | 1/2003 | Philonenko et al. | 709/206 |
| 2003/0028621 A1 * | 2/2003 | Furlong et al. | 709/219 |
| 2003/0065723 A1 | 4/2003 | Kumhyr et al. | |
| 2003/0065955 A1 | 4/2003 | Kumhyr et al. | |
| 2004/0198226 A1 * | 10/2004 | Watson et al. | 455/41.2 |
| 2004/0203890 A1 * | 10/2004 | Karaoguz et al. | 455/456.1 |
| 2005/0101318 A1 * | 5/2005 | Williams et al. | 455/434 |
| 2005/0125498 A1 * | 6/2005 | Frank et al. | 709/206 |
| 2005/0154698 A1 * | 7/2005 | Ikezawa et al. | 707/1 |
| 2005/0197995 A1 * | 9/2005 | Badt et al. | 707/1 |
| 2005/0251555 A1 * | 11/2005 | Little | 709/206 |

FOREIGN PATENT DOCUMENTS

| | | |
|---|---|---|
| JP | 2002034870 | 8/2002 |
| WO | WO 01/61964 A1 | 8/2001 |

* cited by examiner

*Primary Examiner*—William Trost
*Assistant Examiner*—James D Ewart
(74) *Attorney, Agent, or Firm*—Townsend and Townsend/ and Crew LLP

(57) ABSTRACT

Communication between a caller client system and a callee client system is based on selection of a suitable communication program from a list of communication programs. The list of communication programs is determined based on the callee's communication environment.

21 Claims, 4 Drawing Sheets

METHOD AND APPARATUS FOR CHOOSING A BEST PROGRAM FOR COMMUNICATION

BACKGROUND OF THE INVENTION

The present invention relates to networked communication and in particular to selecting suitable communication program(s) for communication among networked users.

Computer-based communications offer many forms of communication including electronic mail (hereafter email), instant messaging (hereafter IM), voice over internet protocol (hereafter VoIP), video conferencing, and so on. Consequently, a person (the caller) who wants to initiate a call (or a communication) may have to decide from among many communication methods. Factors that might be taken into consideration when choosing a communication method might include when the call is being made, to whom (the callee) the call is being made, where the callee is located, the technology that is available to the callee, and so on. This decision making process can become significant in private networks such as peer-to-peer (P2P) networks. In some situations, the caller may want to be certain that she reach the callee and may want to know ahead of time, before making the attempt, whether can be reached or not (and if not, avoid the process of attempting the call).

For example, the time of day the call is made may be important. The callee might prefer one form of communication over another at different times of the day; the callee might prefer email in the evening time (e.g., while asleep) rather than IM. The callee's location may dictate the suitable communication method; e.g., the callee may prefer IM over VoIP if she happens to be having coffee at an Internet cafe where bandwidth might be limited or the quality of service is inadequate. The callee may have specific preferences for a communication method. The devices installed on a callee's system is also a determinative factor. The term "communication environment" will be used herein to represent the collection of factors that are associated with the callee, and which must be given consideration by a caller in order to communicate with the callee.

Thus, the communication environment might include such things as time of day, callee's location, and callee's preference(s). Whether the callee client system is on-line or off-line might be considered to be part of the communication environment when attempting to communicate. Thus, in a P2P network, a user is "on-line" if she is logged onto the P2P network. A user is "off-line" if she is logged off the network. A user could also be considered "off-line" if he is logged on but his PC (laptop, or some other suitable communication device) has been idle for a period of time, or otherwise indicates that he is not available for communication. The on-line/off-line state is commonly referred to as "presence." The callee's presence information can be used to determine a suitable form of communication; e.g., if the callee is on-line then IM may be a suitable and form of communication; whereas if the callee is off-line, a cell phone call might be appropriate.

SUMMARY OF THE INVENTION

The present invention provides automated determination of a set of communication programs from which a caller can choose to communicate with a callee. The list is determined at the callee client system, and is based on the callee's communication environment. The list can be distributed to caller client systems using a buddy list associated with the callee.

BRIEF DESCRIPTION OF THE DRAWINGS

Aspects, advantages and novel features of the present invention will become apparent from the following description of the invention presented in conjunction with the accompanying drawings, wherein.

DESCRIPTION OF THE SPECIFIC EMBODIMENTS

Figure 1:
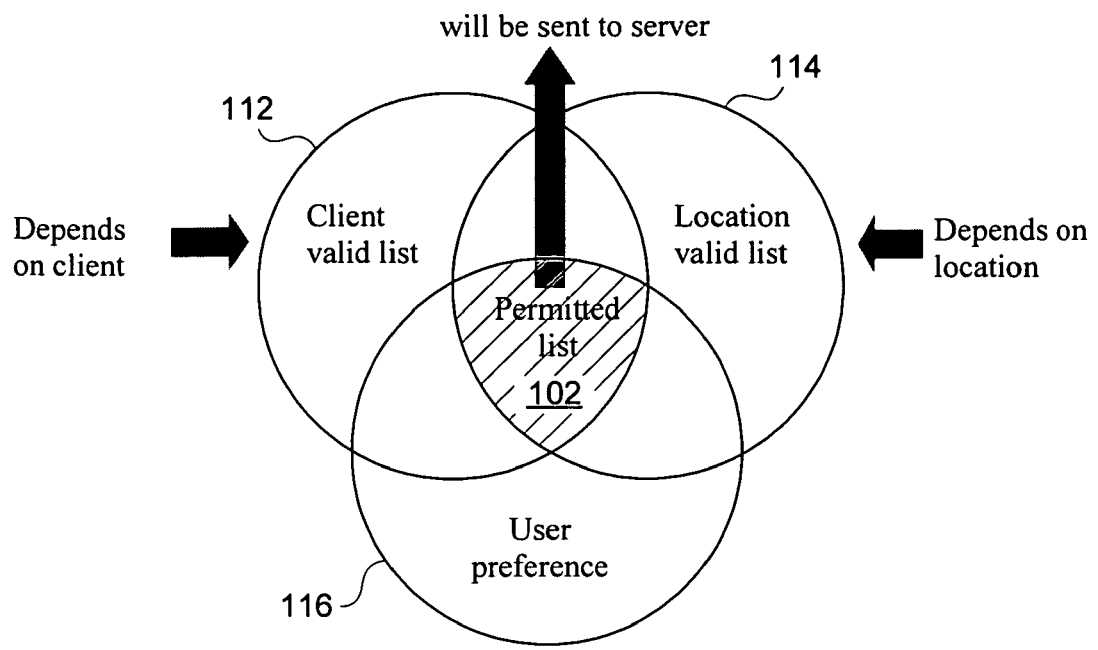
FIG. 1 shows an example of producing a permitted list according to an illustrative embodiment of the present invention.

FIG. 1 introduces the notion of a "permitted list" according to an illustrative embodiment of the present invention. The permitted list identifies those communication programs that are available at a callee client system. Typical examples of a client system (whether a callee client system or a caller client system) include personal computers (PC), laptop computers (laptop), personal data assistants (PDA), and other suitable devices for communication over a network. Typical communication programs include modem programs for communication with a modem. Network type communication programs include various instant messaging techniques, voice over IP, and so on. Video conferencing software systems are another type of communication program. Email clients are yet another type of communication program.

FIG. 1 shows one method for producing a Permitted List 102, shown in the figure by hatched lines. A Client Valid List 112 is a list of communication programs that are installed on the client system device. The Client Valid List 112 can be generated automatically. For example, the Microsoft Windows® registry database can be inspected to obtain a list of communication programs installed in the system. Alternatively, the Client Valid List 112 can be manually created by the user. It is likely, there is only one Client Valid List 112 per device since the list represents the installed communication programs. However, it is possible that the client system device can be configured to enable different sets of communication devices for users. In that case, there would be multiple Client Valid Lists.

The communication methods that are available is likely to vary depending on where the client system device is located; e.g., office, home, hotel room, airport, an Internet cafe, and so on. A Location Valid List 114 identifies the suitable communication programs for a given location which permit communication with a client system device. For example, a network operator such as an ISP (or other network administrator) at a given site might restrict users at that site to specific application programs or a particular protocol; firewalls and proxies may permit only HTTP protocols, for instance. There is a Location Valid List 114 for each such location. Typically, one or more Valid Location Lists will be stored locally on the client system device. Alternatively, predefined Location Valid Lists can be stored on a server and reused by others. This could be convenient for lists associated with public places, such as hotels, airports, and so on. For example, a hotel can provide a Location Valid List indicating what communication programs are appropriate for the communication services offered by the hotel. Thus, when a user moves from the airport, say, to the hotel, the Location Valid List could change.

A User Preference List 116 identifies those communication programs that the user prefers to use for communications. For example, the user may have preference for email and IM, even though her computer is capable of VoIP. The User Preference List 116 can be used to further narrow the list of communication programs in the Permitted List 102.

The Permitted List 102 comprises the list of communication programs that are common to each of the foregoing three lists, namely, the Client Valid List 112, the Location Valid List 114, and the User Preference List 116. The Permitted List is thus created by the callee, and reflects communication programs from the point of view of the callee client system, its location, and its users.

The Client Valid List 112, the Location Valid List 114, and the User Preference List 116 are represented in FIG. 1 as Venn diagrams. The Permitted List 102 is the set that results from the intersection of the other three lists. If that intersection results in the NULL list (i.e., there are no communication programs common to all three lists), then in accordance with a particular embodiment of the present invention, an attempt is made to produce a Permitted List 102 based on an intersection of only the Client Valid List 112 and the Location Valid List 114.

The rationale behind allowing the Permitted List 102 to be determined based only on the Client Valid List 112 and the Location Valid List 114 is that these two sets of communication programs represent a "minimum capability" required for communication with the client system device. First, the Client Valid List 112 identifies those communication programs installed on the callee client system device, and represent the communication capability(ies) of the callee's system. Second, the Location Valid List 114 identifies those programs which will work at that the location associated with that list.

If the Client Valid List 112 includes a modem program, then any caller client system that has a modem program can communicate with the callee, assuming that differences in baud rate can be accommodated by autobauding. If the Client Valid List 112 includes a VoIP communication package from vendor X, then any caller client system with a VoIP communication package that is compatible with vendor X can communicate with the callee. Similarly, if the Location Valid List 114 identifies a special IM communication program from vendor Z, then any caller with a compatible IM communication program can communicate with the callee. If the intersection of the Client Valid List 112 and the Location Valid List 114 is NULL, then the Permitted List 102 is an empty list indicating that the callee cannot be contacted.

A couple of examples will illustrate ideas shown FIG. 1. Suppose the Valid Client List 112 for a callee client system includes the following communication programs:
 ABC-Modem-Program
 XYZ-VoIP-Program Suppose the Location Valid List 114 associated with the current location (e.g., a hotel) of the callee client system includes the following programs:
 SPCL-VoIP-Program It is assumed for this example that XYZ-VoIP-Program and SPCL-VoIP-Program are incompatible; e.g., they may use proprietary protocols. Assume that the User Preference List 116 is empty. Based on the above lists, the Permitted List 102 will be empty because there is no communication program that is common to both lists. Though both lists each have a VoIP program, neither will work with the other, and so there is no common VoIP program.

In the next example, suppose the Location Valid List 114 is updated to include JK-Modem-Program, so the list includes the following:
 SPCL-VoIP-Program
 JK-Modem-Program Since the vast majority of modem devices use standard communication formats and support a basic modem command set (e.g., the AT commands), it can be safely assumed that all modem programs are compatible. Again, it is assumed that the User Preference List 116 is empty. In this example, then, the Permitted List 102 will contain the following program identifiers:
 ABC-Modem-Program
 JK-Modem-Program For the next example, assume the User Preference List 116 specifies the following communication program:
 IM-Program Assume further that the Location Valid List 114 specifies:
 SPCL-VoIP-Pro gram
 JK-Modem-Program There are no communication programs that are common among the Client Valid List 112, the Location Valid List 114, and the User Preference List 116. Consequently, the Permitted List 102 will be determined based on the Client Valid List 112 and the Location Valid List 114, and will include the two modem programs as discussed above.

Figure 2:
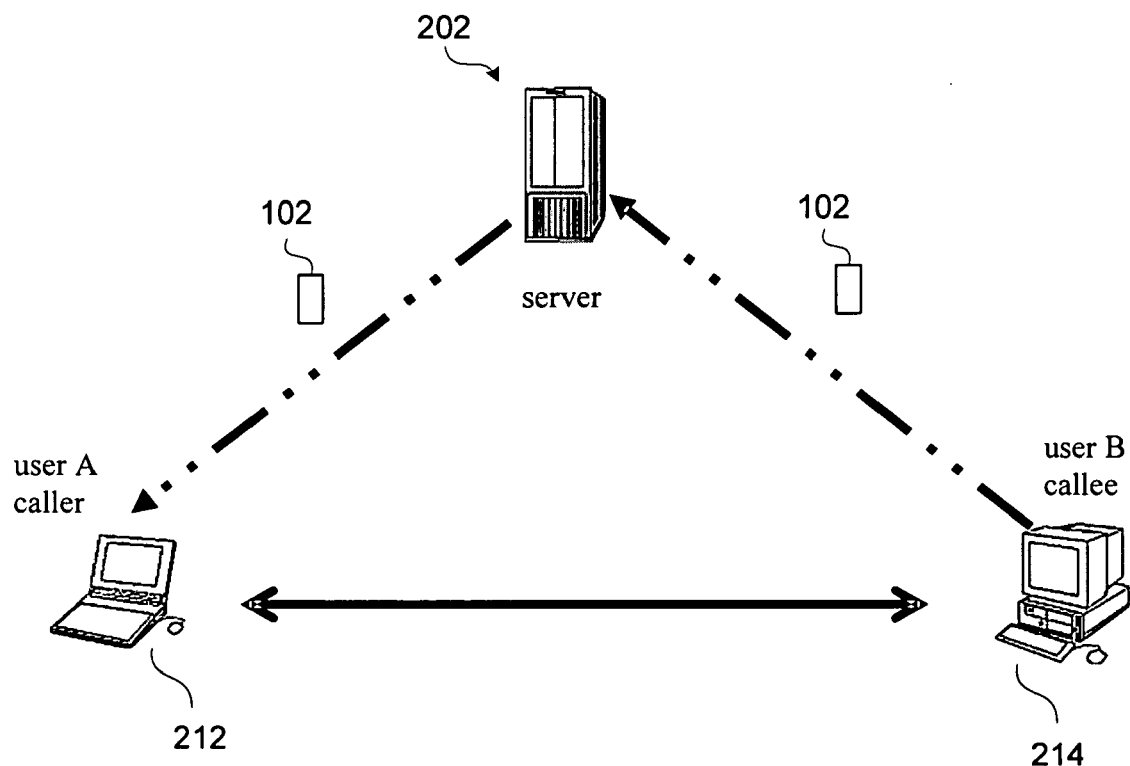
FIG. 2 shows a system-level block diagram illustrating an embodiment of the present invention.

FIG. 2 shows a simple network configured in accordance with the present invention. In a particular implementation, the network is a P2P (peer-to-peer) network. Users on client systems 212, 214 log onto a server 202. As indicated above, user client systems 212, 214 can connect to the network via any kind of communication device that is configured for communication on the network. The client system includes the programs used to perform the login sequence and related tasks. For example, the processing shown in FIGS. 4 and 6, to be discussed below can be performed with suitable software.

The notion of "buddies" and "buddy lists" is well known. Briefly, a particular relationship between two users connected to a communication network is known as a "buddy." A buddy usually indicates a mutually authenticated relationship. For example, an exchange of emails can take place to establish a buddy relationship. Communication techniques such as IM and Microsoft Windows® Messenger use buddy lists. A buddy list is associated with a user, and lists that user's buddy's. Thus, a client system might have one or more buddy lists, one for each user of the client system.

When a user (User A, User B) logs onto the server 202, the user's presence changes from off-line to on-line; such presence information is typically manage by the server. Using the buddy list, the server 202 can then notify the user's buddies of her change in presence on the network. The buddy list can be stored on the server 202, or the buddy list can be communicated to the server as part of the logon sequence. The user's buddies who are logged in can then be informed of the user's presence. Alternatively, the user's client system can perform the notification, which may include having to obtain the presence information for each buddy.

Figure 3:
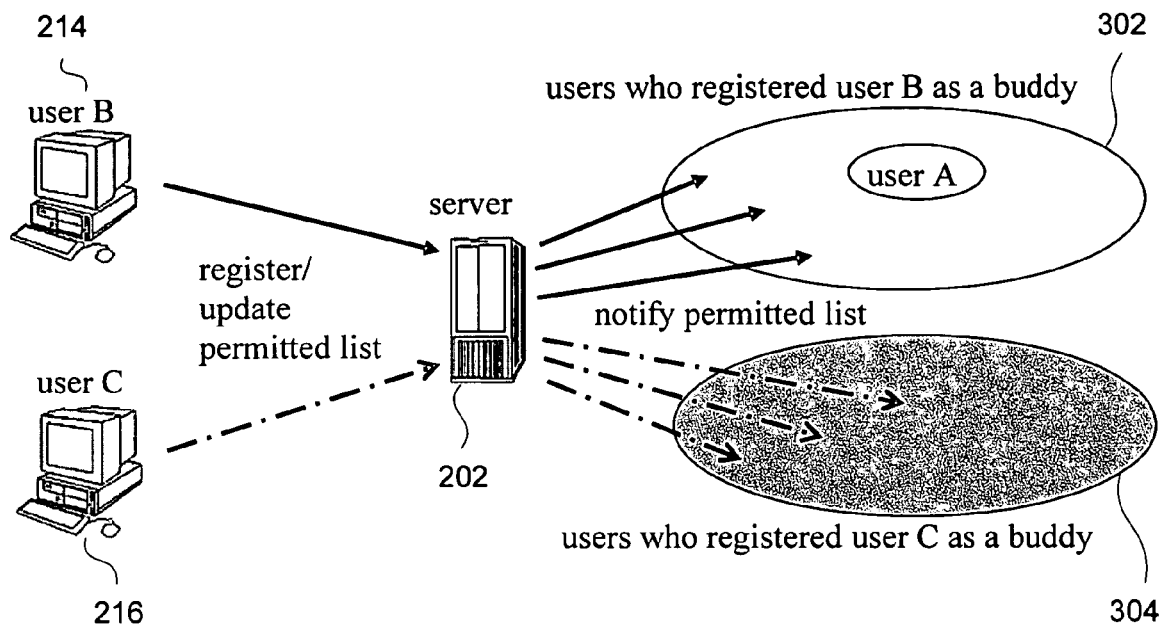
FIG. 3 illustrates distribution of the permitted list in accordance with the present invention.

In accordance with the illustrative embodiment of the present invention, a further action that occurs when a user logs on is that the user's permitted list is distributed according to her buddy list. FIG. 3 graphically illustrates this aspect of the invention. Thus, when User B logs onto the server 202, its client system 214 will communicate User B's Permitted List to users who have a buddy relationship with User B; i.e., users in User B's buddy list 302. For example, User A is on User B's buddy list, and so will receive User B's Permitted List. Similarly if another user, User C, logs on, then User C's client system 216 will communicate her Permitted List according to her buddy list 304.

The Permitted List 102 is associated with each client system having one or more users to whom other users might call, or other establish communication. Such a client system is referred to as a callee client system. Conversely, client systems from which users make calls are referred to a caller client systems. It can be appreciated of course that in most cases, a client system can be a caller client system and a callee client system.

Figure 4:
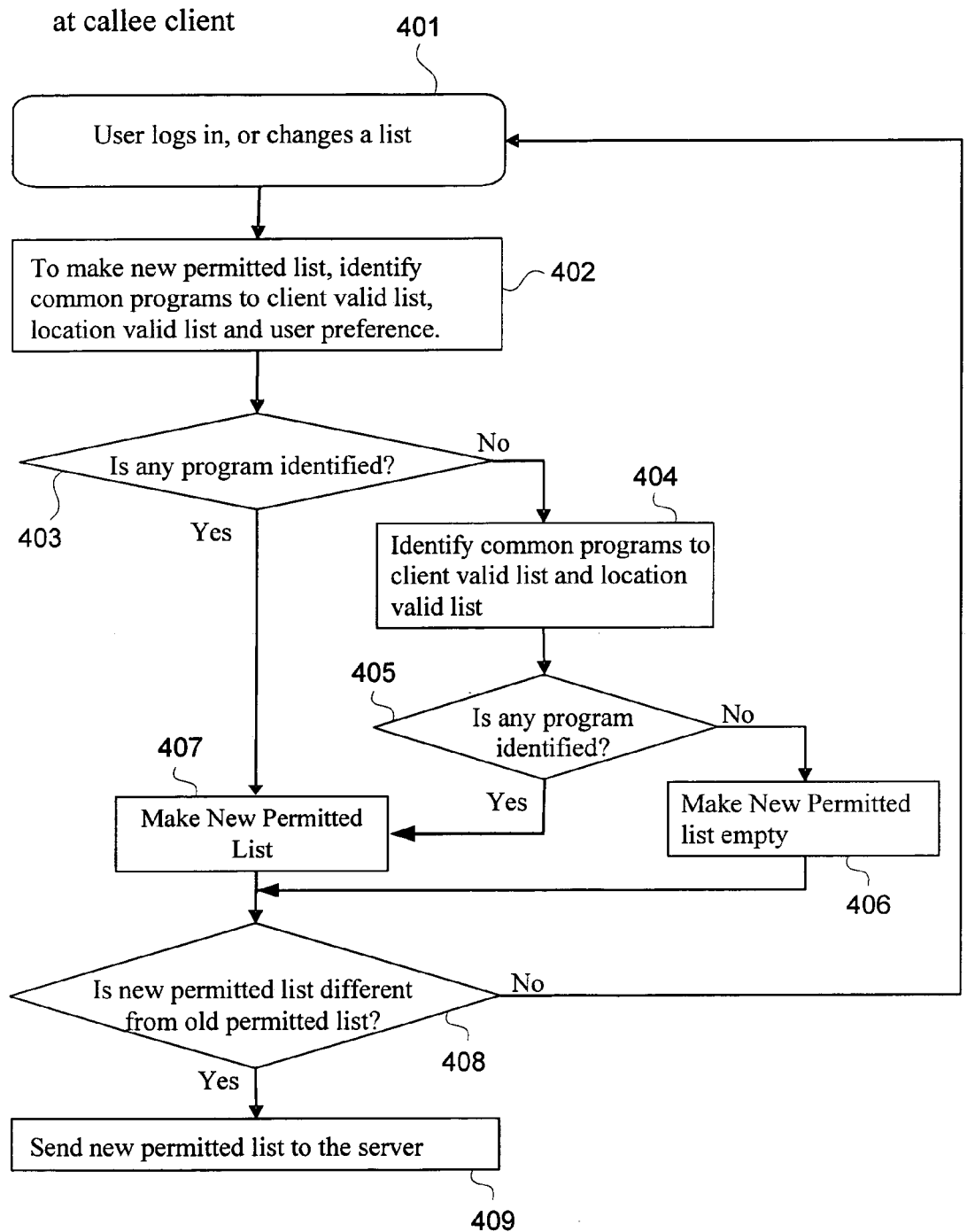
FIG. 4 is a simplified flow chart highlighting aspects of the present invention at the callee side.

The flowchart of FIG. 4 highlights the process flow of a client system that has a Permitted List 102 to be sent to the server 202. At step 401, a user performs an action that initiates creating a Permitted List 102. For example, the user might log onto the system or, having already logged on, make an update to her Client Valid List 112 and/or to her User Preference List 114. Or, the user may move to a new location; e.g., she might take a laptop computer from the office to an Internet-equipped café, thus causing the Location Valid List 114 to change.

In a step 402, the Client Valid List 112, the User Preference List 114, and the Location Valid List 116 are inspected for common communication programs. A determination is made in a step 403 whether there are any common communication programs. If there are common programs, then a Permitted List 102 is created in as step 407 that contains the common programs. If there are no common programs, then just the Client Valid List 112 and the Location Valid List 116 are inspected for common communication programs, in a step 404. If in a step 405, it is determined that there are common programs, the step 407 is performed to produce a new Permitted List. If it is determined in step 405 that there are no common programs, then an empty new Permitted List 102 is created in a step 406. It is noted that "common" programs includes identical programs and compatible programs as discussed below.

Processing of the new Permitted List 102 proceeds with a step 408, where the new list is compared with a previously created Permitted List to determine if the previous version and the new version contain "compatible" communication programs. It can be appreciated that for some communication methods, it is not necessary that the two versions of the list each identifies the identical program. As noted in the above example, modem programs from different vendors may be compatible, despite being from different vendors. Though not shown, it can be appreciated that some form of compatibility table can be used to identify compatible programs, in step 408 and in step 402 above.

If it is determined in step 408 that the new Permitted List 102 is the same as the previously created list, then processing returns to step 401 to await another triggering action. If it is determined that the new Permitted List 102 is different from the previous list, then the new Permitted List is communicated to the Server 202.

Figure 5:
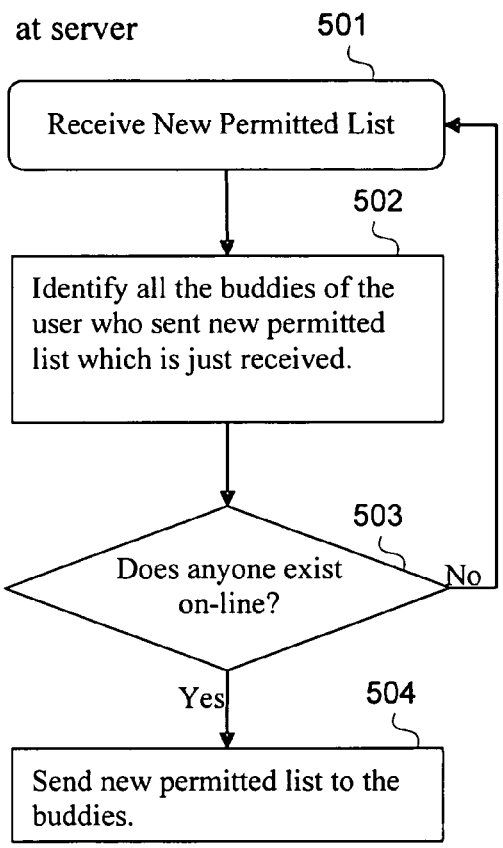
FIG. 5 is a simplified flow chart highlighting aspects of the present invention at the server.

Referring now to FIG. 5, processing of the Permitted List 102 at the server 202 will be discussed. The processing shown in FIG. 5 begins, in a step 501, with receiving a Permitted List 102 from a client system; e.g., callee client system 214 shown in FIG. 2. In a step 502, the buddy list associated with the client system is consulted. The buddy list typically is stored on storage that is accessible by the server 202. Alternatively, the buddy list can be communicated to the server by the client system along with the new Permitted List. Those of ordinary skill can appreciate that other alternatives can be employed, as well.

A determination is made in a step 503 whether any of the buddies identified in the buddy list are on-line. It can be appreciated, of course, that the definition of "on-line" is likely to vary from one implementation to another. For the purpose of the present invention, it is presumed that if the client system (e.g., system 212, FIG. 2) of a buddy listed in the buddy list is on-line, it is then possible to inform that client system of the new Permitted List.

If none of the buddies are on-line, then processing simply returns to step 501 to await another new Permitted List 102 from a client system. Otherwise, in a step 504, for each buddy that is on-line, a communication is made with that buddy's client system informing it of the new Permitted List. Internet technology known as "push technology" can be used to achieve this. The new Permitted List 102 can be "pushed" to the buddy's client system. Alternatively, the buddy's client system can simply be informed of the existence of the new Permitted List, allowing the client system to obtain the information at its convenience. Emailing can be used to communicate the new Permitted List. Different communication methods might be used for different buddies; e.g., Buddy-1 might be informed of the new Permitted List 102 by email, while the new Permitted List 102 might be pushed to Buddy-2. After all the buddies are handled, processing returns to step 501 to await the arrival of a another new Permitted List.

Figure 6:
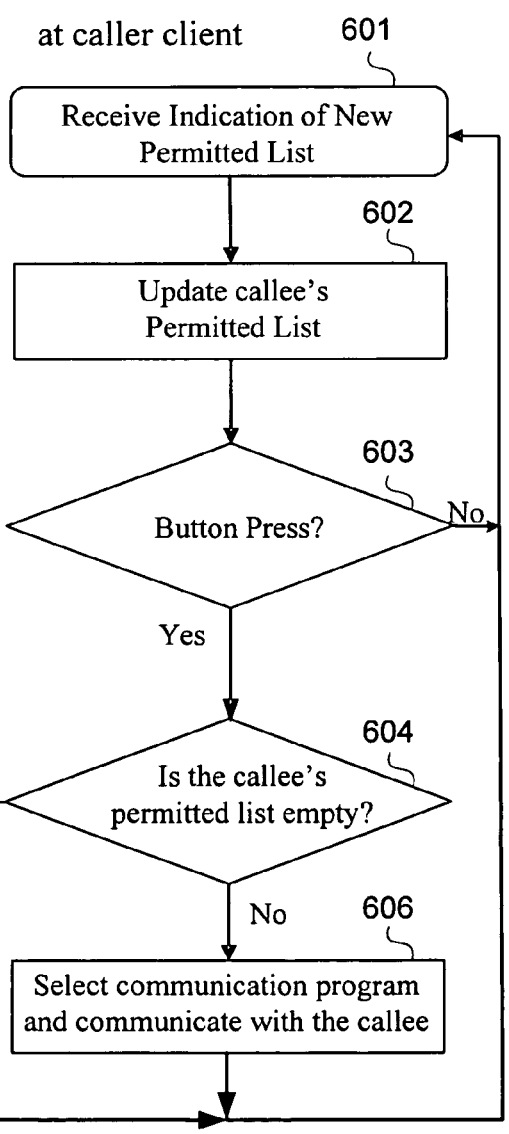
FIG. 6 is a simplified flow chart highlighting aspects of the present invention at the caller side.

Referring now to FIG. 6, processing at a client system that is notified of the Permitted List 102 is discussed. In a step 601, processing begins when a new Permitted List 102 is received, or otherwise communicated by the server 202. If the server simply communicates the existence of the new Permitted List 102, then the client system will have to obtain its contents in some way from the server.

Figure 7:
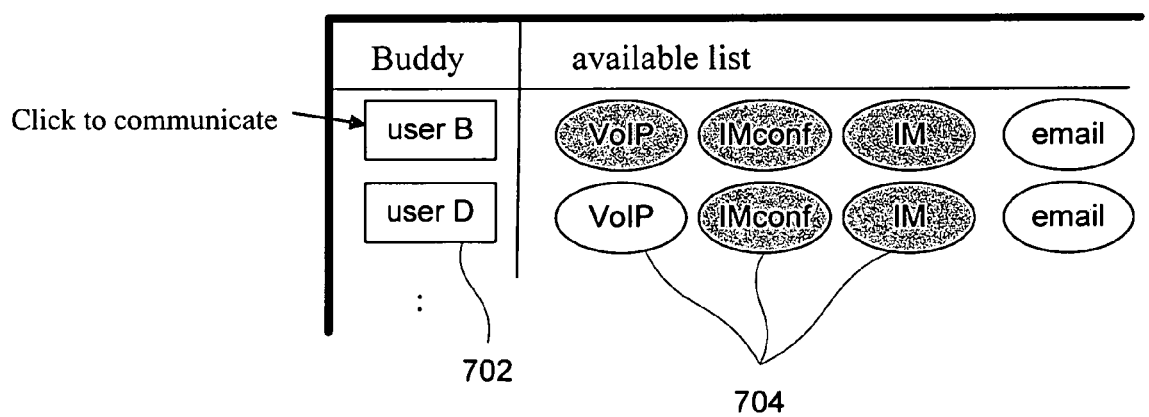
FIG. 7 is a simplified graphical user interface in accordance with the present invention.

The client system maintains one or more callee lists, identifying callees with whom users at the client system can initiate a communication. FIG. 7, for example, illustrates information contained in a callee list as it might be displayed to a user. As can be seen, the information includes an identification of a callee and a list of communication programs associated with the callee. Upon receiving a new Permitted List, the callee list of the callee associated with the Permitted List is updated in a step 602 to reflect the information contained in the new Permitted list.

Referring to FIG. 7 for a moment, the information contained in each callee list can be displayed to a user; e.g., via a graphical user interface (GUI). The GUI exemplar shown in FIG. 7 displays the information that is contained in one or more callee lists in tabular format. The list of callees that is displayed can be dependent on the user; for example, each user may have her own list of callees. The GUI can include a Buddy field to identify each callee. A callee button 702 can be associated with each callee. An Available List field associated with each callee can be used to list the communication programs that are available for communicating with that callee. The figure shows "buttons" 704 associated with each communication program. The buttons of those communication programs that are unavailable for a given callee can be grayed out, as shown in the figure. A user can "click" on a callee button, or on a non-grayed out communication program button to initiate communication with that callee.

Returning to FIG. 6, if a callee button press is detected in a step 603, then a determination is made in a step 604 as to whether the callee list associated with the "pressed" callee button is empty or not. If the callee list is empty, then an appropriate message is displayed at a step 605. If the callee list is not empty, then one of the available communication methods is selected at a step 606. Where the callee list contains more than one communication program from which to choose, some selection criteria can be used. For example, the callee can order the list of programs in terms of preference. The preference information can be included in the Permitted List 102 so that the caller client system can then make a selection based on those preferences. Alternatively, the selection can be based on predetermined criteria; e.g., use VoIP if it is available, if not then try IM, and so on.

In an alternative embodiment, the caller can click on one of the communication buttons 704. Communication with the callee can then be initiated with the selected communication program.

In yet another embodiment, the GUI shown in FIG. 7 can be provisioned with a feature to allow the user to select more than one callee for communication; e.g., drawing a "selection box" around one or more callees in the Buddy field. The criterion for a communication program can be a program that is common among the selected callees. Criteria can be used in cases where there is no common program among the selected callees.

Referring back to FIG. 4, the empty Permitted List 102 can be used when a user logs out of the network. When the server 202 detects a log out sequence, it can send an empty Permitted List to the buddies of the user that is logging off the system. The GUI of a buddy receiving the empty Permitted List will then show all the buttons grayed out for that callee, thus indicating that the callee cannot be reached. Instead of communicating an empty Permitted List, it might be desirable to distinguish between a callee who is on-line but cannot be reached versus a callee who has logged out. In that case, the server can communicate some indication of a callee having logged off instead of sending an empty Permitted List.

What is claimed is:

1. A method for communicating between a caller and a callee comprising:
   communicating with a server system to perform a logon sequence from a first client system, said first client system having a permitted list, said server system being separate from said first client system;
   sending said permitted list from said first client system to said server system;
   receiving said permitted list at said server system from said first client system; and
   sending said permitted list from said server system to one or more second client systems,
   wherein said permitted list identifies one or more communication programs that can be used to communicate with a first user on said first client system.

2. The method of claim 1 wherein said permitted list is based at least on communication programs that are installed on said first client system and which can be used at the location of said first client system.

3. The method of claim 1 wherein said one or more communication programs comprises user-selected communication programs.

4. The method of claim 1 further comprising:
   performing a logon sequence with said server system from a third client system, said third client system having associated therewith a second permitted list;
   communicating said second permitted list to said server system; and
   communicating said second permitted list from said server system to some of said second client systems,
   wherein said second permitted list identifies one or more modes of communication that can be used to communicate with said third client system.

5. The method of claim 1 wherein said first client system further has associated therewith a buddy list, wherein said buddy list comprises said one or more second client systems.

6. The method of claim 1 further comprising modifying said permitted list to produce a modified list and communicating said modified list to said server system, wherein said modified list can be communicated to said one or more second client systems, whereby said one or more second client systems can communicate with said first client system using a communication program selected from among communication programs in said modified list.

7. The method of claim 1 wherein said step of producing a permitted list comprises:
   obtaining first information indicative of a first plurality of communication programs that are stored in said first client system; and
   obtaining second information indicative of a second plurality of communication programs, said second communication programs being based on a location of said first client system,
   wherein said permitted list comprises those communication programs which are common to said first and second plurality of communication programs.

8. The method of claim 7 wherein said step of producing a permitted list further comprises obtaining third information indicative of a third plurality of communication programs that represent a user's predetermined list of communication programs, wherein said permitted list comprises those communication programs which are common to said first, second, and third plurality of communication programs.

9. A method for communicating among client systems comprising:
   receiving at a first client a plurality of permitted lists from a server, wherein each permitted list is stored at a second client from among a plurality of second clients and comprises information associated with one or more communication programs, wherein each permitted list is sent from its corresponding second client to said server;
   presenting at said first client information representative of said permitted lists;
   receiving at said first client a communication request identifying one or more of said second clients; and
   based on said permitted lists, determining a communication program for each of said one or more second clients, and using said communication program to communicate with said one or more second clients to service said communication request.

10. The method of claim 9 wherein each permitted list is created by a user at its associated second client.

11. The method of claim 9 further comprising receiving one or more modified lists from one or more second clients, a modified list being produced when a second client modifies its associated permitted list to identify a different set of communication programs.

12. The method of claim 9 wherein said first client is on a buddy list associated with every second client whose associated permitted list has been received by said first client.

13. A networked communication system comprising:
a plurality of client systems; and
a server system in data communication with said client systems,
a first client system from among said plurality of client systems comprising program code configured to operate said first client system to perform steps of:
creating a first list of one or more communication programs that are operable on said first client system;
creating a second list of one or more communication programs that can be used at the location of said first client system;
creating a permitted list based at least on said first and second lists; and sending said permitted list to said server system,
a second client system from among said plurality of client systems comprising program code configured to operate said second client system to receive a permitted list from said server system, wherein communication to a client system associated with said permitted list can be made using a communication program contained therein,
said server system comprising program code configured to operate said server system to perform steps of:
receiving a permitted list from said first client system;
identifying one or more buddy client systems from a buddy list associated with said first client system; and
sending said permitted list to one or more of said buddy client systems.

14. The system of claim 13 wherein said step of communicating said permitted list to said server system is performed during a logon sequence.

15. The system of claim 13 wherein said permitted list comprises communication programs common to said first list and to said second list.

16. The system of claim 13 wherein said program code of said first client system is further configured to operate said first client system to perform a step of creating a third list of one or more user-selected communication programs, wherein said permitted list is further based on said third list.

17. The system of claim 13 wherein said permitted list comprises communication programs common to said first list, to said second list, and to said third list.

18. A client system in data communication with a server system and configured for communication with other client systems, said client system comprising program code configured to perform method steps of:
creating a permitted list based on communication programs that are installed in said client system and on communication programs that can be used depending on a physical location of said client system; and
communicating said permitted list from said client system to said server system,
wherein said permitted list can be communicated to first client systems from among said other client systems, so that said first client systems can communicate with said client system using communication programs identified in said permitted list.

19. The client system of claim 18 wherein said program code is further configured to perform a method step of communicating with said server system to perform a login sequence, wherein said communicating said permitted list is performed during said login sequence.

20. The client system of claim 18 wherein said client system has associated therewith a buddy list, wherein said buddy list comprises said first client systems.

21. The client system of claim 18 wherein said creating a permitted list is further based on user-selected communication programs, wherein said permitted list comprises communication programs that are common to those installed in said client system, those that can be used depending on said location of said client system, and said user-selected communication programs.

* * * * *